United States Patent [19]

Thatcher et al.

[11] 3,865,893
[45] Feb. 11, 1975

[54] CONVERSION PROCESS UTILIZING HOMOGENEOUS METAL CATALYSTS

[76] Inventors: Judith G. Thatcher; Rudolph C. White, both of c/o Texaco Inc., P.O. Box 3407, Richmond, Va. 23234

[22] Filed: Nov. 30, 1972

[21] Appl. No.: 310,746

Related U.S. Application Data

[63] Continuation of Ser. No. 76,993, Sept. 30, 1970, abandoned.

[52] U.S. Cl. ...... 260/683.2, 252/431 N, 252/431 P, 260/666 A, 260/683.9
[51] Int. Cl. .......................... C07c 5/02, C07c 5/24
[58] Field of Search .......... 260/683.2, 683.9, 666 A; 252/431 P, 431 N

[56] References Cited
UNITED STATES PATENTS 3,110,747 11/1963 Mullineaux ..................... 260/683.9
3,130,237 4/1964 Wald .............................. 260/683.9
3,270,087 8/1966 Heck ............................... 260/683.9
3,290,348 12/1966 Mullineaux ..................... 260/683.9
3,405,194 10/1968 Iwamoto et al. .................... 260/666
3,458,547 7/1969 Coffey ................................ 260/666
3,538,133 11/1970 Knoth ................................ 252/431
3,542,898 11/1970 Butte .............................. 260/683.9
3,548,022 12/1970 Iwamoto et al. .................... 252/431

Primary Examiner—Delbert E. Gantz
Assistant Examiner—C. E. Spresser
Attorney, Agent, or Firm—T. H. Whaley; C. G. Ries

[57] ABSTRACT

This invention relates to processes for converting unsaturated organic molecules such as olefins and dienes to their saturated or isomerized derivatives utilizing three classes of homogeneous metal complexes of the iron triad type as catalytic agents.

3 Claims, No Drawings

CONVERSION PROCESS UTILIZING HOMOGENEOUS METAL CATALYSTS

This is a continuation of application Ser. No. 76,993, filed Sept. 30, 1970, now abandoned.

This invention concerns processes for converting unsaturated organic molecules to their converted derivatives using homogeneous metal complexes as the catalytic agents.

More particularly, this invention relates to processes for hydrogenating and/or isomerizing unsaturates such as olefins and dienes, using three classes of homogeneous metal complexes of the iron triad type as catalytic agents.

Until comparatively recently heterogeneous catalysts have mainly been used in the conversion of unsaturated organic molecules to their hydrogenated and isomerized derivatives. Typical of these catalysts are finely divided colloidal solids such as activated nickel, platinum, palladium and the like. These catalysts, in contrast to homogeneous catalysts, form phases separate from reactants and products and are usually insoluble in the reaction mixture. One of the characteristics which most heterogeneous catalysts share in common is a microporous structure and a very large internal surface area which can, in some instances, approach 1,000 $M^2/g$ or more. Possibly because of the large surface areas involved, many of these catalysts are rather readily inactivated by diverse substances commonly known in the art as catalyst poisons. In view of this propensity, many heterogeneous catalysts suffer from the need for frequent replenishment and if economically feasible, for low cost processes of regeneration. Other shortcomings of heterogeneous catalysts are that they usually require the use of rather elevated reaction temperatures and reaction pressures, and that they have relatively poor selectivity.

By selectivity, as defined herein, is meant the efficiency in catalyzing a desired conversion relative to other undesired reactions. In this instance isomerization or hydrogenation (reduction) are the desired conversions. Selectivity is usually expressed as a factor representing the amount of the isomer or saturate formed, divided by the amount of olefin in the starting material employed. Inasmuch as low selectivity and catalyst poisoning are costly and undesirable problems associated with catalysis, improved and alternative catalytic process which avoid or minimize these problems are continually being sought.

Recently, the applicants have developed three related classes of homogeneous metal complexes which are effective in converting many unsaturated organic molecules to their isomerized or saturated products. These catalytic complexes are especially useful in the conversion of unsaturated hydrocarbons such as cyclic or linear olefins to their desired conversion products. Not only do these catalysts exhibit a relatively high degree of selectivity, but they are comparatively resistant to loss of activity through poisoning, and are capable of achieving high conversions usually within a few hours of the initiation of the reaction.

In practice, unsaturated organic substrates to be converted are contacted with a catalytic quantity of at least one of the three homogeneous, transition metal-containing catalysts of the cobalt-nickel-iron triad type, described below, in a non-aqueous liquid environment, below their decomposition temperatures, at pressures ranging from atmospheric to superatmospheric, in the presence of hydrogen, until the desired conversion takes place. The converted products are separated from the reaction mixture of the usual manipulative techniques used in organic synthesis such as filtration, extraction, distillation or any combination or sequence of these techniques desired.

In the favored practice, each mole of unsaturated hydrocarbon substrate to be saturated or isomerized is contacted, in an environment substantially free from carbon monoxide, water and oxidizing agents, with about 0.01 to 0.1 moles of the cobalt-containing homogeneous catalyst complexes in a solublizing quantity of non-aqueous liquid media at temperatures at least 10° C. below their decomposition temperatures, at superatmospheric pressures ranging from about 300 to 1000 psig and higher, in a gaseous environment provided by hydrogen, until the desired product is obtained. For some applications, the products may be used in the form of the above reaction mixtures while for other purposes the products may be isolated and purified as described before.

In order to aid in the full understanding of the inventive concept the following additional disclosure is submitted:

A. HOMOGENEOUS METAL CATALYST OF THE COBALT NICKEL-IRONTYPE

As indicated earlier, these catalysts as defined are within the structure:

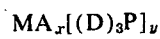

$$MA_x[(D)_3P]_y$$

wherein M is a metal selected from the triad consisting of cobalt, iron, nickel and their mixtures, A is selected from the group consisting of hydrogen, nitrogen and mixtures of nitrogen and hydrogen with the proviso that one "A" at any time must be represented by hydrogen, D is an aromatic organic radical selected from the group consisting of phenoxy ($C_6H_5O$), alkylated phenoxy, phenyl and alkylated phenyl, wherein the alkylating radical contains from 1 to 6 carbon atoms, x is selected from the integers consisting of 1 and 3, y is an integer selected from the group consisting of 3 and 4 and P represents phosphorus.

The preferred homogeneous catalysts are the cobalt-containing catalysts included within the structures:

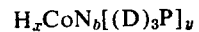

$$H_xCoN_b[(D)_3P]_y$$

wherein b is selected from the group of integers consisting of 0 and 2, H, N and P represent their respective elements, D, x and y have the same values as described previously.

The above homogeneous cobalt complexes are known compounds which can be prepared by several methods described in the literature.

The following procedure is illustrative of the preparation of both the $HCoN_2[(C_6H_5)_3P]_3$ [hydridonitrogen-tris (triphenylphosphine) cobalt (I)] and the $H_3Co[(C_6H_5)_3P]_3$ [trihydridotris (triphenylphosphine) cobalt (III)], when D, the aromatic moiety in the above structure is phenyl. In both instances the acetyl acetonate anion in the form of its cobalt salt is treated with an appropriate ligand and an organo metallic reducing agent. In the former case (1) a continuous flow of nitrogen gas is passed through the reaction media while in the latter reaction hydrogen gas is used.

1. $Co(C_5H_7O_2)_3+3(C_6H_5)_3P+$(Organic reducing-/Agent+$N_2$) $HCoN_2[(C_6H_5)_3P]_3$ 2. $Co(C_5H_7O_2)_3 + 3(C_6H_5)_3P + (Organic\ Reducing-/Agent+H_2)\ H_3Co[(C_6H_5)_3P]_3$ The third group of cobalt compounds, as illustrated by the phosphite: $HCo[(C_6H_5O)_3P]_4$ [hydridotetrakis(triphenylphosphite) cobalt (I)] can be prepared by the reaction of cobaltous chloride with triphenylphosphite with an organo-metallic reducing agent (as above) in non-aqueous media; in a hydrogen or nitrogen atmosphere. The reaction can be represented as below:

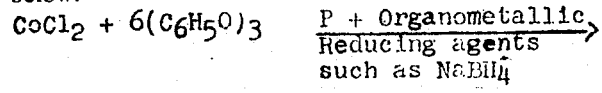

$HCo[(C_6H_5O)_3P]_4$

Hydridonitrogentris(triphenylphosphine) cobalt (I) is an orange crystalline solid having a melting point (with decomposition) at 80° C. The compound decomposes in the presence of oxygen with a loss of nitrogen. It is soluble and inert in aromatic hydrocarbons, alkyl ethers and dimethylformamide, but is sensitive to water.

The trihydridotris(triphenylphosphine) cobalt (III) is a golden crystalline solid, easily oxidized, with a decomposition temperature of about 45° C. in non-aqueous solution under hydrogen. It is soluble in aromatic solvents, alkyl ethers and dimethylformamide and also is sensitive to water.

The hydridotetrakis(triphenylphosphite) cobalt (I) is a pale yellow, crystalline solid which melts with decomposition at about 155°C. It is very soluble in a variety of solvents such as aromatic hydrocarbons, chlorinated hydrocarbons and alkyl ethers. The solid is stable to oxygen and at temperatures of about 25° C. non-aqueous solutions of the complex appear to be stable to oxygen. In non-aqueous solutions, under a hydrogen atmosphere, the complex decomposes at about 130°C.

B. UNSATURATED ORGANIC SUBSTRATES

As defined herein, the substrates of this invention are unsaturated hydrocarbons of 4 or more carbon atoms containing one or more double and/or triple bonds linked from one carbon atom to another. These substrates include olefins both alpha and internal, linear and cyclic dienes and trienes. Illustrative unsaturates include alkenes such as 1-butene, 2-butene, 1-hexene, 2-hexene, cis-2 octene, as well as dienes such as 1,3-butadiene, 1,4-butadiene, 1,3-hexadiene, 2,4-hexadiene, 1,3-cyclohexadiene, 1,4-cyclohexadiene as well as their higher homologs among others.

The unsaturated substrates can be employed in the form of single, neat, discrete compounds or mixtures of these compounds. These unsaturates can contain substantial quantities of inert solvent such as the alkyl ethers, aromatics and alkanes.

C. Reaction Conditions Required

Generally speaking, in order to consistently obtain high conversions of unsaturated organic substrates, particularly of olefins, certain reaction conditions are required. This combination of reaction conditions is referred to as a conversion environment. "Conversion environment" as used herein refers to the combination of conditions necessary to either isomerize or reduce the unsaturated organic substrate to the desired product. This includes a dry, substantially water-free oxygen-free and carbon monoxide-free medium and the appropriate gaseous atmosphere required for the conversion desired. That is, a hydrogen atmosphere where reduction is desired and nitrogen or the noble gases and/or their mixtures when isomerization is the desired conversion reaction. "Conversion temperatures" as defined herein refers to the minimum temperature sufficient for the catalyst to show catalytic activity up to within about 10° to 20° C. of the catalysts' decomposition temperature. Freedom from carbon monoxide is necessary to avoid substantial formation of undesired carbonyl-containing products such as aldehydes and ketones. To assure this, the reactants, solvents and atmosphere must be substantially free from carbon monoxide. Similarly, freedom from moisture and oxidizing agents such as oxygen or chlorine, is necessary to minimize the catalytic complexes' instability under these conditions.

D. Methods of Utilizing Catalysts

Two alternative techniques are used for either reduction or isomerization.

Ordinarily, when the pressurized reactor is employed, the reactor is first evacuated and then filled with hydrogen. The solvent employed is then added and the reactor is again flushed with hydrogen while adding the catalyst complex. At this time the unsaturated substrate is added to the stirred solution. After withdrawing samples for analyses, the reactor is heated to the desired temperature and pressurized to the desired pressure with hydrogen (if hydrogenation is the intended conversion process) or nitrogen or inert gas (if isomerization is desired) according to the conversion process employed.

The heating is continued until the desired conversion product is obtained. Elemental analysis, infra-red, gas liquid partition chromatography and nuclear magnetic resonance are among the analytical methods used to follow the conversion of the unsaturated substrates to their products.

When a non-pressurized reaction flask is used, a weighed quantity of catalyst complex is added to the vessel and the system is evacuated. One atmosphere of nitrogen or hydrogen is added and maintained throughout the reaction. The olefin either in solvent or neat is added to the stirred mixture in the flask and the course of conversion followed by periodic sampling before, during and after conversion.

Inasmuch as each of the three classes of homogeneous catalysts' catalytic activity may be typified by the preferred cobalt complexes described above, and each of said classes have varying activities under varying reaction conditions, each type will be discussed separately.

I. Isomerization

This complex is a highly active isomerization catalyst and readily isomerizes alpha olefins to internal olefins at room temperatures, i.e., 20°–30°C. and atmospheric pressure. Operable isomerization temperatures are somewhat broader, ranging between about 0° C. to about 60° C., and pressures ranging from about 0 to 600 psig. may be employed if desired. However, inasmuch as the best balance of catalyst life and selectivity occurs between about 20° C. and 40° C., these represent the preferred temperature range and 10 to 600 psig represent the preferred pressure range for isomerization. Illustrative olefins include 1-butene, 1-hexene, 1-heptene, 1-octene among others.

II. Hydrogenation a. 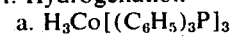

The instant catalyst complex can reduce both alpha and internal olefins at temperatures ranging between about 20° C. and 30° C. at atmospheric or near atmospheric pressures. At temperatures (from about 20° C. to 35° C.) and superatmospheric pressures (from about 200 psig to about 600 psig) dienes and cyclodienes can be reduced. The order of selectivity of olefin reduction with this complex is: Alpha olefins > conjugated cyclic diolefins > 1,3-n-diolefins > non-conjugated cyclic diolefins > cis-olefins > trans-olefins. The reduction of alpha olefins under more severe reduction conditions is independent of pressure. Illustrative of unsaturates which may be used include cis-2-butene, isobutene, 1-butene, 1-hexene, 2-hexene, 1-octene, cis-2-octene, trans-2-octene, 2,4,4-trimethylpentene-1, 1,3-butadiene, 1,3-hexadiene, 2,4-hexadiene 1,3-cyclohexadiene, 1,4-cyclohexadiene among others.

b. $Hco[(C_6H_5O)_3P]_4$

This phosphite has the greatest thermal stability and can be used in reductions between about 90° C. to about 130° C. at near atmosphere to superatmospheric pressures. However, since the complex decomposes in non-aqueous solutions at temperatures above 135° C., economics favors temperatures between about 100° to 120°C. at superatmospheric pressures from about 10 psig to 1,000 psig. Alpha olefins, internal olefins, linear dienes and cyclodienes can all be reduced. However internal, linear olefins such as 2-hexene are very slowly reduced even at 600 psig. Good and rapid reduction of cyclohexadiene to cyclohexane is obtained while other cyclodienes are selectively reduced but much more slowly. An unusual fact is that during reduction a large amount of cis-2-hexene is isomerized to trans-2-hexane. The substrates which lend themselves to reduction include: 1-hexene, 2-hexene, cis and trans 2-hexene, 1,3-butadiene, 1,3-cyclohexadiene, 1,4-cyclohexadiene, 2,4-hexadiene, among others. The catalyst complex is especially useful in the reduction of the cyclic dienes which are relatively recalcitrant to reduction.

The reaction times cannot be stated with precision because of the several experimental factors involved such as the type of conversion, isomerization or hydrogenation, the substrate employed, the catalyst employed and the temperatures and pressures at which the conversions are operated. However, when the preferred isomerization complex $HCoN_2[(C_6H_5)_3P]_3$ is used to isomerize alpha olefins containing 4 to 8 carbon atoms at tempperatures between 20° C. and 40° C. at atmospheric or near atmospheric pressures, generally the reaction takes from 1 to 72 hours with 12 to 36 being an average time. In the case of hydrogenations, when $H_3Co[(C_6H_5)_3P]_3$ is used to hydrogenate alpha olefins containing 4 to 8 carbon atoms at temperatures ranging from 20° to 30° C. at pressures ranging from about atmospheric to 600 psig, the reaction in most instances is complete within 3 hours, more usually between ½ to 1 hour. Similarly, when the preferred phosphite complex $HCo[(C_6H_5O)_3P]_4$ is used to hydrogenate alpha olefins containing 4 to 8 carbon atoms at temperatures between 100° to 120° C. at pressures between about 0 psig to 600 psig, in the most extreme instances, reductions are completed within 6 hours, ordinarily within 2 to 4 hours of inception.

In order to obtain reasonable conversions of the unsaturates within reasonable times, the metal catalyst complexes must be present in significant amounts referred to as "catalytic amounts or quantities." Again, because of the several experimental factors involved and the three classes of catalysts employed only relatively generalized remarks can be made as to what constitutes a catalytic amount. However, when the most active unsaturates, the alpha olefins, are used for either isomerization or hydrogenation, as little as 5 mole percent (based upon olefin content) will produce substantial conversions within several hours of inception. Obviously much larger quantities can be used without deleterious effects, the upper limit being primarily based upon economics.

Inert solvents, while not necessary for success, can be employed if desired to facilitate handling. Aromatics, and ethers are satisfactory inert solvents.

Having described the inventive process in general terms the following embodiments and examples are submitted to illustrate a specific aspects of the inventive concept. Unless otherwise stated, all parts and percentages are by weight rather than by volume.

EMBODIMENT A — PREPARATION OF $HCON_2[(C_6H_5)_3P]_3$

A 10 gram portion of cobalt acetylacetonate $Co(C_5H_7O_2)_3$ and a 30 gram portion of triphenylphosphine are added to 200 ml of toluene contained in an appropriately sized reaction vessel fitted with heating, cooling and stirring means and capable of being flushed with a stream of gas. The solution is stirred and continuously flushed with nitrogen under one atmosphere of pressure. The solution is cooled to about 10° C and 5.1 grams of triisobutyl aluminum (contained in 15 ml of toluene) is slowly added to the stirred solution. The reaction solution is warmed up to 25° C. at which time the color of the reaction mixture, which is originally dark green, changes to dark orange-red. The orange-red solution is reduced to about 1/10th of its volume under vacuum and the addition of 200 ml of normal pentane precipitates bright orange crystals of product. After drying overnight under vacuum, an orange crystalline solid (M.P. 80° C. with decomposition) is produced. This product becomes deactivated in the presence of oxidizing agents.

EMBODIMENT B — PREPARATION OF $H_3Co[(C_6H_5)_3P]_3$

In this embodiment, as in Embodiment A, a 10 gram portion of cobalt acetylacetonate, 30 grams of triphenylphosphine are admixed in toluene and 5.1 grams of triisobutyl aluminum is slowly added to the stirred admixture at 10° C. However, instead of contriuously flushing with nitrogen as in Embodiment A, a continuous stream of hydrogen is passed through the reaction mixture and the product is isolated as in Embodiment A under an inert atmosphere provided by gases such as argon, helium or hydrogen.

EMBODIMENT C — PREPARATION OF $HCo[(C_6H_5O)_3P]_4$

An 0.46 g portion of cobaltous chloride and 6.6g (5.6 ml) of triphenylphosphite are added to 50 ml of ethanol contained in a 100 ml three-neck flask equipped with a stirrer. The ethanol solution is stirred and flushed continuously with nitrogen. Solid $NaBH_4$ (0.65 g) is added gradually to the stirred reaction mixture. A voluminous cream precipitate of a cream colored solid is filtered off in an inert atmosphere. The solid is recrystallized twice from an equi-volume toluene-pentane mixture, washed with pentane, dried under vacuum and stored under nitrogen.

EXAMPLE 1.

Isomerization of 1-Butene Using $HCoN_2[(C_6H_5)_3P]_3$ as the Catalyst Complex

Using the procedure described earlier, section D a 5 mM portion of 1-butene substrate is isomerized to a mixture comprising 71 percent by weight of trans-2-butene and 29 percent by weight of cis-2-Butene. A 0.25 mM portion of $HCoN_2[(C_6H_5)_3P]_3$ in 50 ml of toluene is used as catalyst. The isomerization is run under an atmosphere of nitrogen at 25° C.

EXAMPLES 2–3

Isomerization of Other Olefinic Substrates Using the Catalyst of Example 1.

EXAMPLE 2

In a related process, 1-octene is isomerized to a mixture of cis-2-octene (25 percent), trans-2-octene (46 percent), cis-3-octene, cis-4-octene and trans-3-octene (total of the last three isomers is 29 percent). The reaction is conducted in toluene using a 20 to 1 mole ratio of olefin to catalyst. The isomerization is conducted under 1 atmosphere of nitrogen at 25° C. The reaction time is 68 minutes.

EXAMPLE 3

In a comparable run, cis-2-butene is isomerized to 75 percent trans-2-butene. Reaction conditions employed are toluene solvent, 1 atmosphere of nitrogen, 25° C. temperature and a 20 to 1 mole ratio of olefin to catalyst. The reaction time is 24 hours.

EXAMPLES 4–7

Reduction of Alpha Olefins at Atmospheric Pressures Using $H_3Co[(C_6H_5)_3P]_3$ Formed in situ as Catalyst In these runs, 0.13 mM portion of $HCoN_2[(C_6H_5)_3P]_3$ catalyst (prepared by the method described in Embodiment B dissolved in 50 ml of toluene is added to an appropriate reaction vessel fitted with stirrer and adapted to receive hydrogen gas under pressure. Hydrogen is bubbled through the toluene solution to form $H_3Co[(C_6H_5)_3P]_3$ in situ.

Hydrogen pressure is adjusted to 600 mm and the 1-hexene substrate is added to the stirred solution. The course of hydrogenation is followed by measuring the hydrogen uptake. After 1½ hours hydrogen uptake substantially ceases and the reaction product is isolated. The results of these reductions at less than atmospheric pressure appear in Table 1 which follows:

TABLE I

| Example | Ratio of Olefin to Catalyst | Hydrogen Pressure (mm) | % Conversion | Reaction Time mins. |
|---|---|---|---|---|
| 4 | 61:1 of 1-hexene | 600 | 50 | 49 |
| 5 | 14:1 of 1-hexene | 760 | 30 | 10 |
| 6 | 49:1 of 1-octene | 600 | 50 | 55 |
| 7 | 21:1 of 1-octene | 760 | 66 | 12 |

As can be seen from the above table, alpha olefins are reduced rapidly at lower olefin to catalyst ratios.

However, in related embodiments internal and branched olefins such as cis-2-butene and 2,4,4-trimethylpentene-1 are reduced much more slowly and trans-2-octene is not reduced at all within an hour using conditions comparable to those used in the reduction of the alpha olefins shown in Table I.

EXAMPLES 8–21

Reduction of Various Olefins at 25° C. Using a Pressurized Reactor and $H_3Co[(C_6H_5)_3P]_3$ Catalyst The instant examples show the effect of variations of superatmospheric pressures on the rate of reduction and percent of conversion. Table II records the date.

TABLE II

| Example | Olefin | Hydrogen Pressure psig | 1 hr. | % Conversion Substrate 3 | 5 | 18 | Rate mM/ min. | At Percent Conversion |
|---|---|---|---|---|---|---|---|---|
| 8 | 1-hexene | 600 | 57 | 68 | — | — | 0.26 | 50% |
| 9 | 1-hexene | 10 | 67 | 74 | — | — | 0.33 | 64% |
| 10 | 1-hexene | 10 | 67 | 75 | 76 | — | 0.33 | 64% |
| 11 | 1-hexene | 600 | 70 | 75 | — | — | 0.4 | 50% |
| 12 | cis-2-octene | 600 | 2 | 3 | 4 | 10 | 0.002 | 4% |
| 13 | cis-2-octene | 10 | 3 | 6 | 8 | 22 | 0.005 | 4% |
| 14 | 1,3-hexadiene | 10 | 20 | 25 | 30 | — | 0.027 | 30% |
| 15 | 1,3-hexadiene | 600 | 35 | 68 | 73 | — | 0.082 | 40% |
| 16 | 1,3-cyclohexadiene | 10 | 26 | 33 | 42 | — | 0.027 | 40% |
| 17 | 1,3-cyclohexadiene | 600 | 44 | 80 | 100 | — | 0.15 | 40% |
| 18 | 1,4-cyclohexadiene | 10 | 10 | 24 | 36 | — | 0.019 | 40% |
| 19 | 1-butene | 80 | 53 | 58 | — | — | 0.2 | 50% |
| 20 | isobutene | 80 | — | — | — | 22 | 0.018 | 20% |
| 21 | 1,3-butadiene | 600 | 25 | 52 | 65 | 22 | 0.06 | 34% |

EXAMPLE 22

Hydrogenation of 1-Hexene Utilizing $Hco[(C_6H_5O)_3P]_4$ Complex.

Using the reduction procedure and apparatus described in section D, 16 mM of 1-hexene is hydrogenated in toluene solution utilizing 1 mM of $HCo[(C_6H_5O)_3P]_4$ prepared as in Embodiment C. The reaction is conducted at 100°–110° C. under a hydrogen atmosphere under 600 p.s.i.g., and the reaction time is 3.5 hours. A 70.8 percent yield of hexane is obtained.

EXAMPLES 23–30

Other Hydrogenations Using HCo[(C₆H₅O)₃P]₄ Complex.

Using the reduction procedure described in Examples 4–7 hydrogenations are carried out using the above catalytic complex. The experimental details appear in Table III which follows:

TABLE III

$HCo((C_6H_5O)_3P)_4$-Catalyzed Olefin Hydrogenations in Stirred Reactor

| Example No. | Olefin (16mM) | $H_2P$ psig | Temp °C. | 1 hr | % Conversion 3 hrs | 5 hrs | 18 hrs | Rate mM/min | At % Conversion |
|---|---|---|---|---|---|---|---|---|---|
| 23 | 1 hexene | 20 | 100–110 | 45.5 | 70 | 74 | | 0.16 | 30 |
| 24 | do. | 600 | 100–130 | 56.5 | 67 | 70 | | 0.20 | 38 |
| 25 | do. | 600 | 100–110 | 48.5 | 66 | 71 | | 0.19 | 36 |
| 26 | 2-hexene(84% cis 16% trans) | 600 | 100–110 | 2.0 | 3.0 | 4.3 | | 0.005 | 2 |
| 27 | 1,3-cyclohexadiene | 600 | 105–120 | 33.6 | 92.6 | 100 | | 0.11 | 34 |
| 28 | 1,4-cyclohexadiene | 600 | 105–110 | | 32.0 | 47.6 | | 0.028 | 32 |
| 29 | 2,4-hexadiene | 600 | 110 | 12.0 | 35 | 44 | | 0.031 | 35 |
| 30 | 1,3-butadiene | 600 | 105 | 33 | 95.6 | 100 | | 0.09 | 33 |

As the preceding specification, including embodiments and examples show, the inventive process is advantageous in several respects. For instance, this invention makes available for the first time a novel group of iron triad type homogeneous complexes which function well at relatively low temperatures as hydrogenation and/or isomerization catalysts for the conversion of unsaturated organic molecules to their saturated and/or isomerized derivatives. Further advantages are rapid and high reductions of unsaturated hydrocarbons, usually within the first few hours of hydrogenation, at low reaction temperatures, and at pressures between 0 to 600 psig and higher.

While the homogeneous catalysts used in the inventive process only function well within a narrow range of reaction temperatures, in other respects they offer considerable latitude without departing from the inventive concept. For example, the catalyst may be run neat or using any one of several different aromatic solvents. Further, catalysts employing different metals of the iron triad group may be used interchangeably, and as illustrated by H₃Co[(C₆H₅)₃P]₃ the catalyst may be generated and utilized in situ. The metes and bounds of this invention are best determined from a perusal of the claims which follow read in light of the previous specifications.

What is claimed is:

1. A process for isomerizing alpha (α) olefins containing at least 4 carbon atoms to their isomerized internal olefinic products, comprising contacting each mole of said olefins to be isomerized to olefinic products with about 0.01 to about 0.1 moles of homogeneous cobalt catalytic complex consisting essentially of:

$$HCoN_2[(C_6H_5)_3P]_3$$

at temperatures ranging between about 0°C. and about 60°C. at pressures ranging from about 0 psig to about 600 psig, in a solubilizing amount of non-aqueous, inert solvent media in an inert atmosphere substantially free from carbon monoxide and oxygen, said atmosphere being selected from the group of gases consisting of nitrogen, the noble gases and mixtures thereof, until the desired, isomerized internal olefinic products are formed.

2. The process of claim 1 wherein the process is carried out at temperatures between about 20°C. and 40°C. and pressures between about 10 psig and 600 psig, and the unsaturated olefin is selected from the group consisting of alpha olefins and cis-olefins.

3. A process for hydrogenating olefinic substrates selected from the group consisting of alpha olefins, internal olefins, linear dienes and cyclodienes containing at least 4 carbon atoms to produce their desired and corresponding saturated alkanes, comprising contacting each mole of said olefinic substrates to be hydrogenated with about 0.01 moles to 0.1 moles of homogeneous cobalt complex catalyst consisting essentially of:

$$H_3Co[(C_6H_5)_3P]_3$$

at temperatures ranging from about 20°C. to about 35°C., at pressures ranging from about atmospheric to about 600 psig, in a solubilizing quantity of inert, non-aqueous solvent media in a hydrogen environment substantially free from carbon monoxide and oxygen, until the desired saturated alkanes are formed.

\* \* \* \* \*